United States Patent
Napoleoni et al.

(10) Patent No.: US 8,768,779 B2
(45) Date of Patent: Jul. 1, 2014

(54) NETWORK LAYER INTEGRATION FOR SUPPORTING INTERNET ACCESS, VOICE OVER INTERNET PROTOCOL, AND INTERNET PROTOCOL TELEVISION SERVICES

(75) Inventors: Luana Napoleoni, Rome (IT); Olivier Brie, Biot (FR)

(73) Assignee: Accenture Global Services Limited, Dublin (IE)

( * ) Notice: Subject to any disclaimer, the term of this patent is extended or adjusted under 35 U.S.C. 154(b) by 1873 days.

(21) Appl. No.: 11/637,959

(22) Filed: Dec. 12, 2006

(65) Prior Publication Data

US 2008/0049920 A1 Feb. 28, 2008

(30) Foreign Application Priority Data

Aug. 23, 2006 (EP) .................................... 06425595
Aug. 23, 2006 (IT) .............................. MI2006A1639

(51) Int. Cl.
*G06Q 30/00* (2012.01)
(52) U.S. Cl.
USPC ...................................................... 705/26.1
(58) Field of Classification Search
CPC .......................................... G06Q 30/06–30/08
USPC .................................................. 705/26–27.2
See application file for complete search history.

(56) References Cited

U.S. PATENT DOCUMENTS

| | | | |
|---|---|---|---|
| 6,901,440 B1 | 5/2005 | Bimm et al. | |
| 8,195,528 B1 * | 6/2012 | McLellan et al. | 705/26.81 |
| 2007/0081523 A1 * | 4/2007 | Mishra | 370/352 |
| 2007/0192362 A1 | 8/2007 | Caballero et al. | |
| 2008/0120189 A1 | 5/2008 | Singh et al. | |

FOREIGN PATENT DOCUMENTS

| | | |
|---|---|---|
| WO | WO 97/29443 | 8/1997 |
| WO | WO 02/091209 | 11/2002 |
| WO | WO 2004/046858 A2 | 6/2004 |

OTHER PUBLICATIONS

European Search Report dated Jan. 30, 2007, for corresponding international Application No. EP 06 42 5595.
Oracle: "Service Fulfillment Manager" [Online] Feb. 2002, XP 002512854.
Annex to the European Search Report for corresponding international Application No. EP 10 18 2570, dated Nov. 9, 2010.

* cited by examiner

*Primary Examiner* — Ethan D Civan
(74) *Attorney, Agent, or Firm* — Brinks Gilson & Lione

(57) ABSTRACT

A system and method for automatically provisioning a composite telecommunications product comprising a plurality of sub-products or services in response to a single customer order are provided. A composite telecommunications product may comprise, for example, Internet Access (IA), Voice over Internet Protocol (VoIP), and Internet Protocol Television (IPTV) services bundled together as a single product. The present invention allows all three sub-products to be automatically provisioned in response to a single customer order for the composite product.

42 Claims, 10 Drawing Sheets

Fields Required for Header:

| Field Name |
|---|
| CustomerCode |
| OrganizationCode |
| BEName |
| ExecState |
| BEInstanceId |
| ReceivedDate |

Fig.3

Field Required for Address:

| Field Name |
|---|
| AddressNum |
| StreetType |
| City |
| Country |
| ZIP |
| State |
| Address |

Fig.4

Field Required for Contact:

| Field Name |
|---|
| ContactEmail |
| ContFirstName |
| ContLastName |
| ContactTitle |
| ContactWorkPhone |
| ContactPhone |

Fig.5

Field Required for Customer:

| Field Name |
|---|
| FirstName |
| CustomerCode |
| AcquisitionDate |
| PhyFlag |
| Language |
| PersonalID |
| Email |
| FaxNum |
| PhoneNum |
| MSegment |
| Name |
| LastUpdateDate |

Fig.6

Field Required for Service Account:

| Field Name |
|---|
| ListOfAddress |
| ListOfContact |

Fig.7

Field Required for Organization:

| Field Name |
|---|
| AddressID |
| City |
| Country |
| FaxNumber |
| PhoneNumber |
| Name |
| OrganizationCode |
| OrganizationID |
| PostalCode |
| State |
| Street Address |

Fig.8

Field Required for Billing Account:

| Field Name |
|---|
| BillAccountCode |

Fig.10

Field Required for Payment Data:

| Field Name |
|---|
| BankAccountNumber |
| BankAccountType |
| BankBranch |
| BankName |
| PayerFirstName |
| PayerLastName |
| PayerPersonalID |
| CreditCardExpirationDate |
| CreditCardNumber |
| CreditCardType |

Fig.9

Field Required for Service Order:

| Field Name |
|---|
| OrganizationCode |
| CustomerCode |
| BillingAccountCode |
| OrderDate |
| OrderId |
| OrderPriority |
| SOStatus |
| ActionType |
| SalesForceID |

Fig.11

Field Required for Product:

| Field Name | 88 |
|---|---|
| ActionCode | |
| ProductInstanceId | |
| BillingAccountCode | |
| StartDate | |
| EndDate | |
| DueDate | |
| ModifyDate | |
| CustomerCode | |
| LineNumber | |
| CRMOrderId | |
| ParentOrderItemId | |
| RootOrderItemId | |
| ServiceAccountDesc | |
| ServiceAccountId | |
| ServiceId | |
| SOrderType | |
| ParentProductId | |
| ProductCatalogId | |
| OrganizationCode | |
| TopProductId | |
| SalesForceID | |
| ServiceType | |
| ActivationFlg | |
| BillingFlg | |
| IntegrationId | |
| Status | |
| TariffName | |
| TariffID | |

Fig.12

Field Required for Refill:

| Field Name | 90 |
|---|---|
| Chanell | |
| ScratchCardNumber | |
| TransactionCode | |
| Amount | |
| RequestDate | |
| Currency | |

Fig.13

Field Required for Billing Profile:

| Field Name | 92 |
|---|---|
| PaymentMethod | |

Fig.14

Field Required for Service Order Response:

| Field Name | 94 |
|---|---|
| OrderId | |
| ActivationDate | |
| Status | |
| BackOfficeErrorText | |
| CustomerCode | |

Fig.15

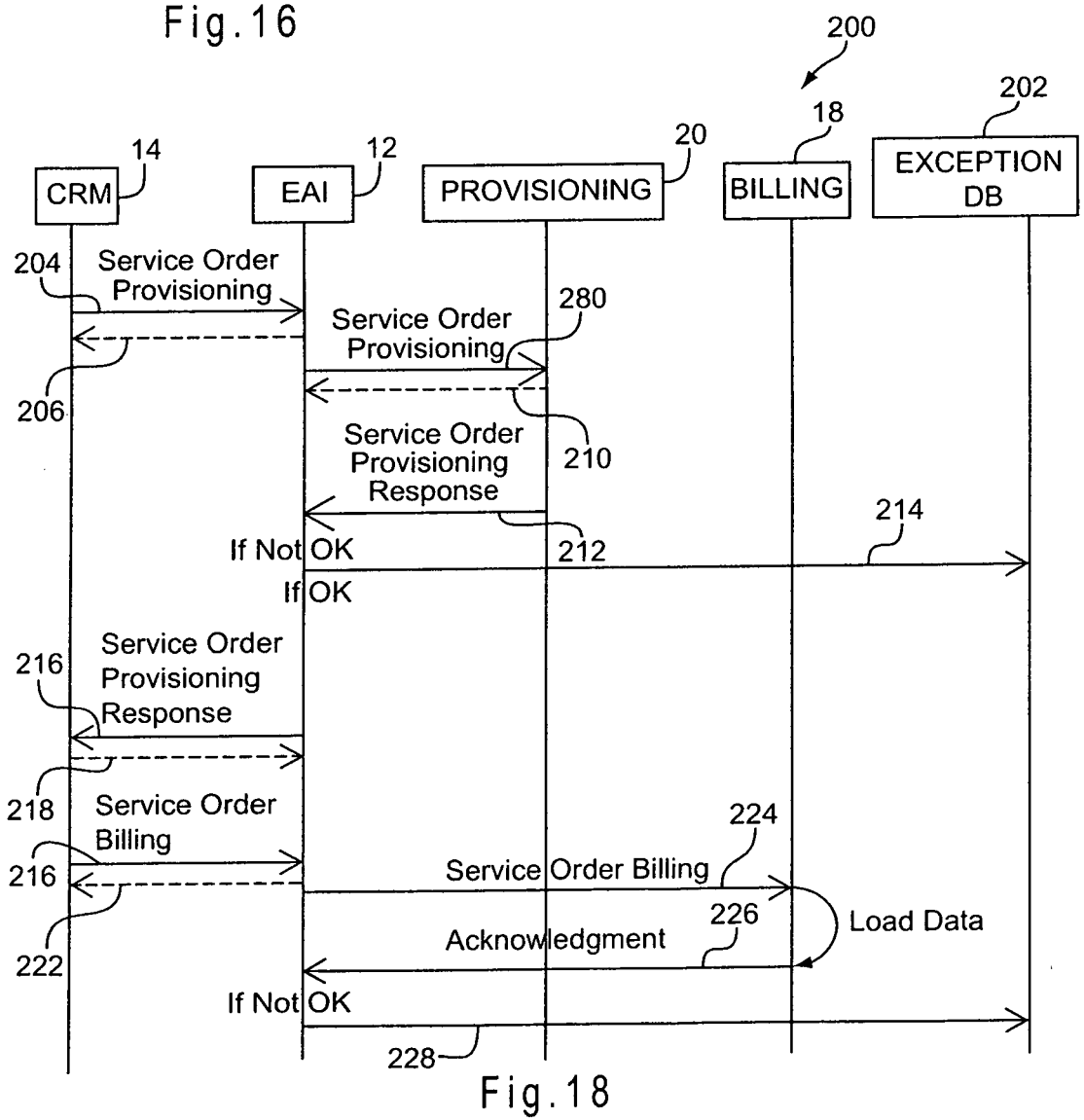

NETWORK LAYER INTEGRATION FOR SUPPORTING INTERNET ACCESS, VOICE OVER INTERNET PROTOCOL, AND INTERNET PROTOCOL TELEVISION SERVICES

This application claims the priority benefit of EPO Application No. EPO06425595.3 filed Aug. 23, 2006, and Italian Application No. MI2006A001639 filed Aug. 23, 2006, both of which are incorporated herein by reference in their entirety.

TECHNICAL FIELD

The invention relates to systems and methods for provisioning telecommunications services products that include multiple sub-products or services in response to a single customer order.

BACKGROUND INFORMATION

The rapid advances in communications technologies of recent years have greatly expanded the service options available to telecommunications consumers. Today consumers have choices over the types of services they choose to employ, as well as the technology platforms on which they elect to receive such services. Just a small sampling of the types of services consumers may take advantage of include voice communication, email, instant messaging, text messaging, internet access, audio and video broadcast services, and so on. Voice services may be provided over traditional land lines, wirelessly via a cellular telephone network, or over packet switched networks using Internet Protocols. Audio and video, traditionally broadcast wirelessly over the public airwaves as radio and television signals, are now available via broadband cable networks or as streaming media over the internet using Internet Protocols as the media transport layer. In sum, there are many different communications services available today. Likely there will be many more available in the near future. And there will be ever more flexible ways of delivering communications services to customers.

The proliferation of new services and the new mechanisms for delivering them provide great opportunities for telecommunications service providers. New services provide opportunities for new sales. In this environment the ability to quickly develop and roll out new telecommunications products and services will be a great competitive advantage. What is more, customers typically rely on a suite of telecommunications products and services to meet their communications needs. Often it is more convenient for customers to purchase or subscribe to a single umbrella product that is a composite of all of the individual products and services the customer needs. For example, a customer may wish to receive internet access, voice communications and television service from a single source and delivered via an IP network connection. Preferably the customer will purchase all three services as a single composite product that incorporates internet access (IA), voice over internet protocol service, and internet protocol television service (IPTV). For convenience, the composite product may be given its own descriptive name. For example, the product including IA, VoIP, and IPTV may be referred to as "Triple Play" based on the three services incorporated into a single product.

For customer service, accounting, and other business reasons, it is desirable to treat a composite telecommunications product such as the Triple Play product as a single product as opposed to an aggregation of individual products sold separately. Operationally, however, each service must be individually provisioned and activated whenever a customer purchases the composite product.

An end-to-end solution for provisioning the sub-products and services associated with a composite telecommunications services product is desirable. Preferably such a system would be capable of provisioning and activating multiple services and telecommunications products based on a single customer order for a single composite product. Such a system should be capable of monitoring the provisioning of each service and reporting exceptions, as well as reporting when all provisioning tasks for all of the services are complete.

BRIEF SUMMARY

The invention relates to a system and method for automatically provisioning a composite telecommunications product comprising a plurality of sub-products or services in response to a single customer order. A composite telecommunications product may comprise, for example, a Triple Play product that includes Internet Access (IA), Voice over Internet Protocol (VoIP), and Internet Protocol Television (IPTV) services bundled together as a single product. The present invention allows all three sub-products to be automatically provisioned in response to a single customer order for the composite Triple Play product.

A system for provisioning orders for a composite telecommunications services product that includes a plurality of bundled services includes a Customer Relationship Management Module (CRM) for interacting with a customer. The CRM generates an order for the composite telecommunications services product. The order generated by the CRM identifies the composite telecommunications services product and each bundled service that comprises the composite product. An Integrated Order Management System (IOM) is also provided. The IOM receives the customer order, decomposes the order, and identifies tasks that must be performed for provisioning each of the bundled services. Finally a provisioning system is provided for performing the provisioning tasks identified by the IOM. The provisioning system is adapted to communicate the status of the various tasks back to the IOM.

A method of provisioning a communications product comprising a plurality of communications services includes providing an enterprise application integration module for facilitating data communication between a plurality of systems applications according to a shared data model. A customer order for the communications product is generated in a customer relationship management application. A service order for provisioning request for provisioning the product is sent from the customer relationship management application to an order management application associated with the enterprise application integration module. The order management application parses the service order for provisioning request and generates a list of tasks for provisioning the product. The provisioning tasks are communicated to a provisioning application, and the status of each task is monitored by the order management application. The provisioning application performs the provisioning tasks and alerts the customer relationship management application when the provisioning tasks are complete.

Other systems, methods, features and advantages of the invention will be, or will become apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

FIG. 3 is a table showing the data fields in the shared data object Header.

FIG. 4 is a table showing the data fields in the shared data object Address.

FIG. 5 is a table showing the data fields in the shared data object Contact.

FIG. 6 is a table showing the data fields in the shared data object Customer.

FIG. 7 is a table showing the data fields in the shared data object Service Account.

FIG. 8 is a table showing the data fields in the shared data object Organization.

FIG. 9 is a table showing the data fields in the shared data object Payment Data.

FIG. 10 is a table showing the data fields in the shared data object Billing Account.

FIG. 11 is a table showing the data fields in the shared data object Service Order.

FIG. 12 is a table showing the data fields in the shared data object Product.

FIG. 13 is a table showing the data fields in the shared data object Refill.

FIG. 14 is a table showing the data fields in the shared data object Billing Profile.

FIG. 15 is a table showing the data fields in the shared data object Service Order Response.

FIG. 16 is a table showing the data fields in the shared data object Adjustment.

FIG. 17 is a table showing the data fields in the shared data object Attribute.

FIG. 18 is a sequence diagram illustrating the messages exchanged in response to Service Order For Provisioning and Service Order for Provisioning Response business events.

DETAILED DESCRIPTION OF THE DRAWINGS AND THE PRESENTLY PREFERRED EMBODIMENTS

Figure 1:
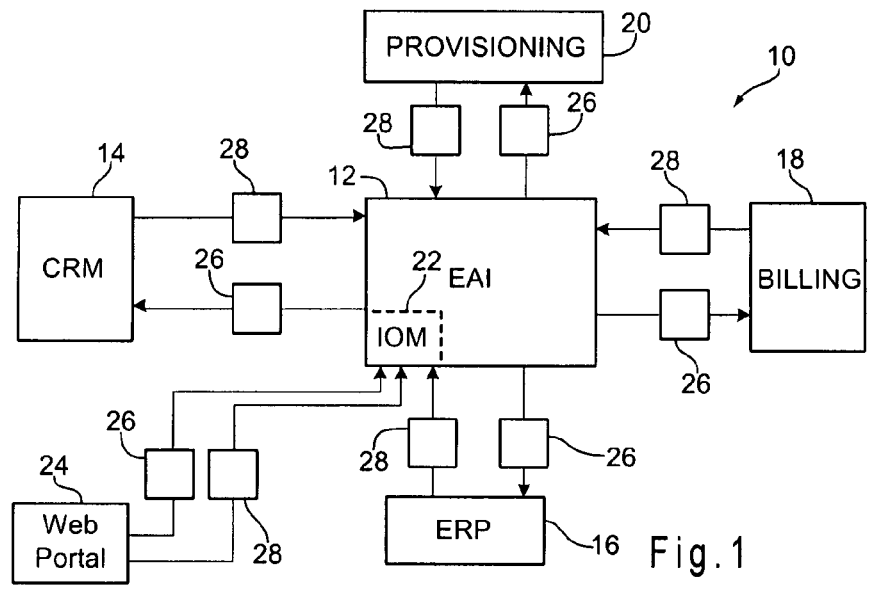
FIG. 1 is a block diagram of an application integration framework according to an embodiment of the invention.

FIG. 1 shows a block diagram of an application integration framework 10 for integrating the various systems and applications employed by a telecommunications service provider for managing the delivery of telecommunications services to customers. The integration framework 10 comprises a plurality of substantially independent applications united by a central Enterprise Application Integration (EAI) module 12. The EAI 12 acts as an intermediary for allowing the various applications to communicate data to one another. Applications integrated within the integration framework 10 may include, a Customer Care (CC) or Customer Relationship Management (CRM) system 14, an Enterprise Resource Planning (ERP) system 16, a Billing system 18, a Provisioning system 20 and an internet web portal 24. Additional applications may be integrated as necessary to support the various needs of a particular telecommunications operator.

A CRM system 14 manages customer relationships in an organized manner so that management, sales people, customer service representatives, and perhaps even customers themselves, may directly access information regarding purchased products, available offers, hardware and other service delivery requirements, and so forth. CRM 14 may be provided by a commercially available customer relationship management package such as Siebel provided by Oracle The billing system 18 provides invoicing and accounting functions for the products and services delivered to customers. The functions of the Billing system may include maintaining billing data, maintaining a catalog of available products and services, maintaining rates and applying discounts, aggregating recurrent charges and usage charges, generating customer bills, and so forth. The billing system 18 may be Geneva provided by Convergys. The ERP system 16 is intended to help manage business operations including product planning, parts purchasing, inventory maintenance, interacting with suppliers, tracking orders, and the like. The ERP system 16 may be R/3 provided by SAP. The provisioning system 20 performs the functions necessary to set up and deliver a service. The provisioning system provides all of the services necessary to set-up a service, including equipment, wiring and transmission. The provisioning system covers the functionality required for the activation and deactivation of products and services on network elements, including configuring network elements, programming network databases with customer information, and so forth. The provisioning system 20 may be the Imagine OSS (iOSS) system provided by Accenture. The web portal 24 allows external users, including customers and external applications, to share data with the various other applications integrated by the integration framework 10. The web portal 24 may be ACS for Customer Portal provided by Accenture.

The EAI module 12 is the heart of the integration framework 10. The EAI module 12 may be based on a number of different platforms, such as Microsoft Biztalk 2004, Tibco, BEA. The EAI 12 allows the various applications to seamlessly exchange data using a shared data model. The EAI 12 allows the various applications to act in a cohesive manner to accomplish a number of logical and cross functional business processes.

Figure 2:
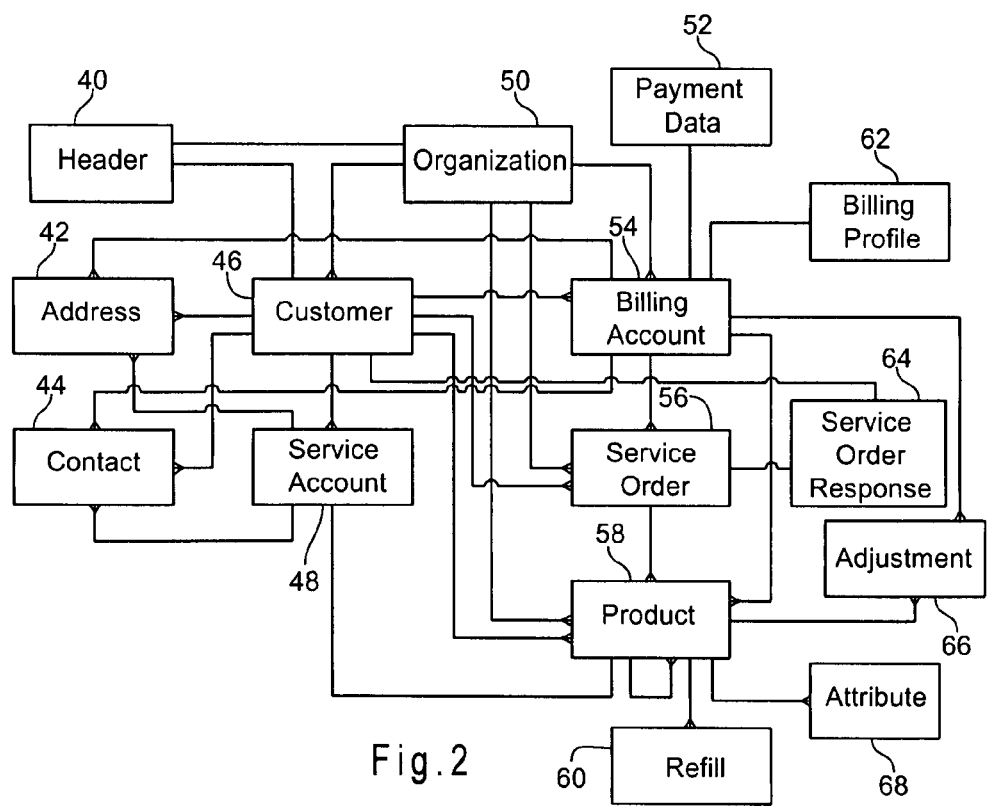
FIG. 2 is a graphical illustration of the relationships between the main data objects of the shared data model employed by the application integration framework.

FIG. 2 shows the primary data objects of the shared data model employed by the integration framework 10 and the relationships between the various data objects. A Header 40 contains internal EAI routing information. Header is used to keep track of the status of business events and to determine message routing. FIG. 3 is a table 70 listing the data fields in a Header data object.

The data object Address 42 describes a customer's primary address. FIG. 4 is a table 72 listing the data fields in an Address data object.

The data object Contact 44 defines a person who is a customer's main contact person. If a customer is an individual the customer and the contact will be one and the same. If the customer is a business however, a Contact may be a person at the business responsible for obtaining and administering telephone and other telecommunications services. FIG. 5 is a table 74 describing the data fields comprising a Contact data object.

The data object Customer 46 represents the entity for which services are provided. The Customer may be an actual human person, a company, or some other legal entity capable of entering transactions and buying products and services. FIG. 6 is a table 76 describing the data fields comprising a Customer data object.

The data object Service Account 48 represents the address (es) and the contact(s) for a particular customer. The Service Account data object assigns a contact and an address to specific products or services. FIG. 7 is a table 78 describing the data fields comprising a Service Account data object.

The data object Organization 50 represents the organization a customer belongs to. FIG. 8 is a table 80 describing the data fields comprising an Organization data object.

The data object Payment Data 52 contains information to be passed on to various applications depending on the type of payment, for example, the bank account number, bank name, bank branch, and so forth. FIG. 9 is a table 82 describing the data fields comprising a Payment Data data object.

The data object Billing Account 54 identifies the entity that will be invoiced by the billing system 18. The Billing Account contains the information needed by the billing system to generate bills for the products and services consumed by a customer. FIG. 10 is a table 84 describing the data fields comprising a Billing Account data object.

The data object Service Order 56 contains general information regarding an order such as customer information, the billing account information, the order type, and so forth. FIG. 11 is a table 86 describing the data fields comprising a Service Order data object.

The data object Product 58 contains information for identifying various products and services available to customers. The data within the product data object 58 includes data relating to the tasks that must be performed by the billing and provisioning systems 18, 20 and for tracking the status of such tasks. FIG. 12 is a table 88 describing all of the data fields comprising a Product data object.

The data object Refill 60 represents a refill request by a customer to refill or recharge a pre-paid product or service. FIG. 13 is a table 90 describing the fields comprising a Refill data object.

The data object Billing Profile 62 contains information relating to how and when (i.e., how often) a bill is sent to a customer. FIG. 14 is a table 92 describing the data fields comprising a Billing Profile data object.

The data object Service Order Response 64 includes data forming an acknowledgment from the provisioning system 20 to the CRM 14 indicating that the requirements for provisioning the products associated with a specific order have been fulfilled. FIG. 15 is a table 94 describing the data fields comprising a Service Order Response data object.

The data object Adjustment 66 represents an adjustment that may be made to the balance of either a post-paid account or on a pre-paid product. FIG. 16 is a table 96 describing the data fields comprising an Adjustment data object.

The data object Attribute 68 includes parameters that define the characteristics of each product or service which are needed by the provisioning and billing applications. FIG. 17 is a table 98 describing the data fields comprising an Attribute data object.

Returning to FIG. 1, a plurality of unique input and output interfaces 26, 28, are constructed between the individual applications and the EAI module 12. The input and output interfaces 26, 28 support all messages necessary to transport data from one application to another so that data generated in one application may be used by another. The ability to share data in this way allows the integrated applications to work in concert with one another to efficiently perform all of the tasks necessary to manage the delivery of telecommunications services to customers. The various input interfaces 26 may be adapted to translate data from an application's native format into the format of the shared data model employed by the EAI when an application publishes data for use by another application. Similarly, the output interfaces 28 may be adapted to translate data from the format of the shared data model into an application's native format when an application receives data from another application via the EAI 12.

An integrated order management module (IOM) 22 is associated with the EAI 12. The IOM 22 processes and tracks customer orders. Customer orders processed by the IOM 22 may require provisioning, changing or de-provisioning various services. The capabilities of the IOM 22 include process and workflow management, order decomposition, order recomposition, task management, status management, order and status reporting, jeopardy and service level agreement (SLA) reporting, supplement processing, cancel processing, move, change and delete actions, and so forth.

Within the integration framework 10, data are exchanged between applications according to a publish and subscribe format using predefined structured data messages referred to as Business Events. Each Business Event defines a specific message format for delivering specific data from one application to another. The publishing application, the subscribing application and the data objects contained within the message are defined for each type of Business Event. Separate Business Events are defined for each type of data transaction that must occur between the various applications. Thus, for any given implementation of an integration framework 10 there will be a limited number of predefined Business Events corresponding to the particular data transactions required by the particular applications integrated by the framework. All data exchanges between the various applications take place via messages corresponding to the format requirements of one or another of the predefined Business Events. According to the implementation shown in FIG. 1 predefined Business Events may include:

Customer Create
Modify Customer General Data
Modify Customer Fiscal Address
Create Account
Modify Account General Data
Modify Account Billing Profile
Modify Account Bill To Person
Modify Account Bill To Address
Modify Account Payment Data
Service Order For Provisioning
Service Order For Provisioning Response
Service Order For Billing
Acknowledgment Event
Activation Each predefined Business Event includes specified data objects for routing the corresponding message and communicating the appropriate data associated with the Business Event to the appropriate application. Some Business Events relate to business processes such as establishing or modifying customer accounts, while others relate to operational processes such as provisioning network elements for delivering products and services. The Business Events Service Order For Provisioning, Service Order For Provisioning Response, and Activation are related to provisioning network products and services.

A Service Order For Provisioning message is published by the CRM 14 in response to a customer order. A Service Order For Provisioning message includes all of the data needed by the provisioning system 20 to provision, de-provision, or modify the product(s) or service(s) called for in a customer order. An order may include a single product or a composite product that includes a plurality of sub-products. Furthermore, each product or sub-product may include different attributes such as tariffs, bandwidth requirements, hardware requirements, and the like. A separate address or a separate contact may be associated with each product, sub-product, or service. Thus, a message corresponding to a Service Order For Provisioning Business Event must contain the following Shared Data Objects:

Header
Service Order
(List of) Products
(List of) Attributes
Service Account
(List of) Addresses
(List of) Contacts The List Of Products relates to each product associated with an order, including the sub-products or services associated with a composite or bundled product. The List Of Attributes relates to the various attributes associated with each product identified in the List Of Products, as do the List Of Addresses and the List Of Contacts.

A Service Order For Provisioning Response message is published by the provisioning system in response to a Service Order For Provisioning Message. The CRM is the only subscriber to a Service Order For Provisioning Response message. A Service Order for Provisioning Response message contains the Shared Data Objects:

Header
Service Order Response

Finally, an Activation message may be published by the Web Portal 24 or the CRM 14 depending on how the service activation process is set up. In either case, the provisioning system 20 is the subscriber. An Activation Message is published when the equipment necessary to deliver a service to a customer is in place and the network elements necessary to deliver the service have all been configured and the customer is ready to being using the service. An Activation Message includes the Shared Data Objects:

Order Item
(List of) Attributes.

FIG. 18 is a sequence diagram 200 showing an overview of the order provisioning process employing the integration framework 10. The sequence diagram 200 illustrates the various messages exchanged between the CRM 14, the EAI 12, the billing system 18, and an exceptions handling database 202 associated with the IOM 22. The provisioning process begins in the CRM 14 when a customer orders a new product, requests changes to an existing product subscription, or cancels an existing product subscription. A customer service representative enters the order in the CRM 14 and the CRM begins processing the order. The CRM 14 initiates the provisioning process by publishing a Service Order For Provisioning message to the provisioning system. The Service Order For Provisioning message 204 is first sent from the CRM 14 to the EAI 12. Details of the Service Order For Provisioning message are echoed back to the CRM 14 at 206 so that the CRM can verify that the Service Order For Provisioning message was accurately transmitted to and received by the EAI 12. The EAI 12 then forwards the Service Order For Provisioning message to the provisioning system at 208. The provisioning system similarly echoes the received message back to the EAI 12 at 210, to ensure accurate transmission of the Service Order For Provisioning message from the EAI 12 to the provisioning system 20. The provisioning system 20 provisions the network elements necessary to deliver the product (or products) identified in the Service Order for Provisioning message to the customer specified in the original order. When provisioning is complete the provisioning system 20 publishes a Service Order For Provisioning Response message to the CRM 14 via the EAI 12. The Service Order for Provisioning Response message is sent from the Provisioning System 20 to the EAI at Step 212. The EAI 12 examines the contents of the message. If the Service Order For Provisioning Response message indicates that there was a problem provisioning the order the EAI 12 forwards the Service Order For Provisioning message to the Exceptions Database 202 at step 214. Regardless of whether the Service Order For Provisioning Response includes an error message, the EAI 12 then forwards the Service Order For Provisioning message to the CRM 14 at 216. The CRM 14 echoes the Service Order For Provisioning Response message back to the EAI 12 at 218 to ensure that the message was accurately transmitted to and received by the CRM 14. If the Service Order For Provisioning Response does not include notice of any provisioning errors, provisioning is complete and the operational systems and components necessary to deliver the service to the customer are in place and properly configured to deliver the service to the customer. However, while provisioning is complete, additional business processes may be required to begin monitoring the service and to account for the customer's usage and bill for the service.

When provisioning a composite product that includes multiple sub-products or services, the provisioning process becomes more complex. In general, the CRM 14 initiates the provisioning process by publishing a Service Order For Provisioning message, and the process concludes when the CRM receives a Service Order Provisioning Response from the provisioning system 20 indicating that the product, including all of the sub-products and services, has been successfully provisioned. However, a number of intermediate steps may be required to successfully provision the individual sub-products and services bundled together to create the single composite product. In this case, the CRM 14 publishes a Service Order For Provisioning message that includes Product shared data objects for the composite product as well as for each of the individual sub-products or services included in the composite product. The EIA 12 receives the Service Order For Provisioning message and before forwarding the Service Order For Provisioning message to the provisioning system 20 diverts it to the IOM 22. The IOM 22 decomposes the Service Order For Provisioning message and identifies each of the products that must be provisioned in order to implement the entire composite product. The IOM 22 generates a list of tasks that must be performed before provisioning the composite product is complete. The task list is generated based on product configuration data stored in a Product Catalog associated with the IOM 22. The task list is not necessarily limited to provisioning the network elements necessary to deliver the service, but may also include manual tasks such as shipping/installing Customer Premises Equipment (CPE), activating services once the CPE equipment is installed, and so forth. The IOM 22 communicates the various tasks to the appropriate systems for carrying out the identified tasks, and monitors the status of the tasks as the various systems carry them out. Once all of the tasks are complete and the provisioning system 20 publishes a Service Order For Provisioning Response indicating that the composite product has been successfully provisioned, the IOM 22 causes the EAI to forward the Service Order For Provisioning Response message to the CRM 14 and provisioning is complete.

An example of a composite product that includes a plurality of sub-products or services is the "Tripe Play" product that includes Internet Access (IA), voice over internet protocol (VoIP), and internet protocol television (IPTV) services bundled into a single product. In this case a customer subscribes to a single product—the Triple Play—and receives all three services: IA, VoIP and IPTV. Since the three services are bundled together as a single product, it is desirable that they be provisioned together in response to a single order.

When a customer orders the Triple Play, a customer service representative (CSR) enters the order in the CRM 14. The CRM 14 publishes a single Service Order For Provisioning message to the provisioning system 20 as described above. In order to provision the Triple Play product, the provisioning system must provision each of the IA, VoIP and IPTV services. Therefore, the Service Order For Provisioning message generated by the CRM 14 in response to the Triple Play order must include the data necessary to provision all three services. As with any Service Order For Provisioning message, the Service Order For provisioning message for provisioning the Triple Play product must include a Header, a Service Order, a List of Products, a List of Attributes, a Service Account, a List of Addresses, and a List of Contacts.

A sample Service Order For Provisioning message 300 for provisioning a Triple Play product is shown in FIGS. 20A-20D. The data objects contained in the Service Order For Provisioning message 300 correspond to those described above for a Service Order For Provisioning Business Event, namely a Header 302, a Service Order 304, a Product 306, Attributes 308, 310 relating to the Triple Play product 306, and Service Account 342. The Service Order For Provisioning message 300 further includes Product data objects 312, 326, 336 relating to the Internet Access, VoIP and IPTV sub-product components of the Triple Play product. Attribute data objects 314, 316, 318 are associated with the product 312, as is the Service Order data object 320. The Service Order data object further includes Address data object 322 and Contact data object 324. Attribute data objects 328, 330 and 334 are associated with Product 326, and Attribute data objects 338, 340 are associated with Product 336.

Note that the Product data object 306 associated with the composite Triple Play product includes the data fields defined for a Product data object (see FIG. 12). Of special note are the ActionCode, ProductInstanceID, LineNumber, CRMOrderID, ParentOrderID, RootOrderID, and ProductCatalogID fields. The value -ADD- in the ActionCode field indicates that the Triple Play is a new product to be added to the customer's account. Alternative ActionCodes might call for the modification or cancellation of a product or service described in a Service Order For Provisioning message for a product to which the customer already is a subscriber. The ProductInstanceID 1-5PVX is a unique identifier identifying this particular implementation of the product. The LineNumber is a sequential number identifying each line item in the product order. Each line item in turn corresponds to a particular product instance. The CRMOrderID identifies the CRM order. The ParentOrderID identifies the parent order from which a product depends within a product hierarchy in which products may have sub-products, and sub-products may have sub-sub-products and so forth.

For Product data object 306 there is no value entered for the parent order ID because the Product data object 306 is at the top of the product hierarchy. The RootOrderItemID identifies the top level order in the Service Element or Product hierarchy. In this case the RootOrderItemID points to the same value as the ProductInstanceID, namely 1-5PVX, because the Triple Play product is at the top of the product hierarchy. The ProductCatalogID field provides a unique product identifier. In this case, the value 6000 corresponds to the composite Triple Play product. The Attribute data objects 308, 310 correspond to the composite Product data object 306, and in this case provide tariff data related to the composite Triple Play product.

The Product data objects 312, 326 and 336 are nested within a ListOfProducts associated with the composite Triple Play Product data object 306. The Product data objects 312, 326, 336 relate to the Triple Play sub-products Internet Access 312, VoIP 326, and IPTV 336. For Product data object 312 the ActionCode again holds the value -ADD-, indicating that the Internet Access product is to be added to the customer's account as opposed to being modified or canceled. The ProductInstanceID 1-5PW5 is a unique identifier identifying the specific customer implementation of Internet Access. The LineNumber Value -2- indicates that the Internet Access product is the second line item in the original order from the CRM 14. Again, the CRMOrderID 1-IGN-9 identifies the original CRM order. The ParentOrderID value 1-5PVX identifies the composite Triple Play product as the parent product from which the Internet Access product depends within the established product hierarchy. The RootOrderID value 1-5PVX likewise points to the composite Triple Play product as the root product in the product hierarchy. Finally, the ProductCatalogID value 6001 is a unique identifier identifying the Internet Access product. The Product data object 312 further includes the Attribute data objects 314, 316, 318. The ActionCode value for each attribute data object 314, 316, 318 is again Add. The ParentID field for each data object 314, 316, 318 is I-5PW5 indicating that the attribute data objects 314, 316, 318 each relate to the Internet Access Product data object 312. The Attribute data object 314 relates to the bandwidth to be allocated to this particular instance of the Internet Access product, and Attribute data objects 316, 318 relate to the billing tariffs to be applied.

The Product data object 312 further includes the Service Account data object 320, which itself includes the Address data object 322 and the Contact data object 324. The Address data object 322 includes data identifying the primary customer address and the Contact data object 324 includes data identifying the primary customer contact.

Product data object 326 relates to the VoIP product. The data fields are similar to those in Product data object 312. The ProductInstanceID stores a unique value 1-5PWL, identifying the present implementation of the VoIP service product. LineNumber stores the value 3 indicating that the VoIP product was the third line item on the original order from the CRM. Again the ParentOrderID field and the RootOrderID field point to the composite ProductInstanceID 1-5PVX, since the VoIP product, like Internet Access, depends from the Triple Play composite product, and the Triple Play composite product is at the top of the product hierarchy. The ProductCatalogID 6003 is a unique identifier for the VoIP product. Finally, the Product data object 322 includes the Attribute data objects 328, 330, 332. The Attribute data objects 328, 330, 332 identify the appropriate tariff to be applied to the VoIP product. The Service Account data object 334 in this case holds no additional data.

Product data object 336 relates to IPTV. Again, the data fields in the Product data object 336 are similar to those in the Product data objects 312, 326. The ProductInstanceID 1-5PWP is a unique identifier for this particular implementation of the IPTV product. The CRMOrderID 1-IGN-9 identifies the original order created in the CRM, and the ParentOrderID and RootOrderID values, 1-5PVX in both cases, identify the Product data object 306 for the composite Triple Play product as the product from which the VoIP product depends, and as the product at the top of the product hierarchy, respectively. The ProductCatalogID 6002 is a unique identifier for the IPTV product. The Product data object 336 concludes with Attribute data objects 338, 340 which specify the tariffs to be applied to the IPTV product and the Service Account data object 342, which in this case holds no additional data. The Product data object 336 concludes the List Of Products associated with the Product data object 306 in the Service Order For Provisioning message 300. The Product data object 306, and the Service Order For Provisioning message 300 in general, conclude with the Service Account data object 344, which in this case contains no additional data.

By definition the CRM 14 publishes the Service Order For Provisioning message. The provisioning system 20 is the only subscriber. In the sequence diagram 200 of FIG. 18 described earlier, the Service Order For Provisioning message is sent from the CRM 14 to the EAI 12 and the EAI forwards it to the provisioning system 20. However, significant intermediary processing occurs before the EAI 12 forwards the Service Order for Provisioning message to the provisioning system 20. The EAI 12 first routes the Service Order For Provisioning message to the IOM 22.

The IOM 22 manages the tasks that must be performed to successfully provision the order. The IOM 22 decomposes the Service Order For Provisioning message, identifies the products and services contained therein, and generates a list of tasks that must be performed to successfully provision each of the identified products and services. The tasks may include both manual and automated tasks, such as shipping customer premises equipment (CPE) to the customer, installing and configuring the CPE, as well as network element configuration and other provisioning tasks performed by the provisioning system 20. The IOM 22 assembles the task list based on data stored in a Services Catalog associated with the IOM. The service catalog is where products, including bundled products containing multiple different products such as the Triple Play product, are created and the provisioning process for implementing the products is defined. Provisioning tasks are defined and stored in the Services Catalog during product creation or service definition. A task definition portion of the database maps key task related reference data important to provisioning an order.

In the case of the Triple Play product, the task list generated by the IOM 22 includes the following tasks:
  Internet Access CPE Shipment
  Internet Access Network Provisioning
  Internet Access Activation
  Internet Access CRM Update
  VoIP Network Provisioning
  VoIP Activation
  VoIP CRM Update
  IPTV Network Provisioning
  IPTV Activation
  IPTV CRM Update
  Triple Play CRM Update.

The IOM 22 communicates the tasks to the various systems responsible for carrying out the tasks and monitors their status. The IOM 22 communicates updates to the CRM 14 when various tasks are complete, and reports Errors to the exceptions database 202 when tasks fail to be completed in a satisfactory manner or fail to be completed within a desired period of time.

The tasks associated with provisioning the composite Triple Play product and the individual component products comprising the Triple Play product are monitored separately. Each product comprising the Triple Play product, or at least aspects of each product, may be provisioned in parallel with other products by the provisioning system 20. The IOM 22, however, initiates the various provisioning tasks in a single message to the provisioning system 20. The IOM 22 re-composes the Service Order For Provisioning message sent by the CRM 14 and causes the EAI 12 to forward it to the provisioning system 20. The provisioning system 20 then carries out all of the network provisioning tasks necessary to set-up and configure the network to deliver the component products of the Triple Play. The re-composed Service Order For Provisioning message is substantially identical to service order for provisioning message originally published by the CRM 14, except for the addition of various data for processing and tracking the progress of the order in the IOM 22. The provisioning system 20 receives the Service Order For Provisioning message and performs the services necessary to set up the products or service defined in the Service Order For Provisioning message. In the case of the Triple Play product, the provisioning system takes the steps necessary to provision Internet Access, VoIP and IPTV.

Figure 21:
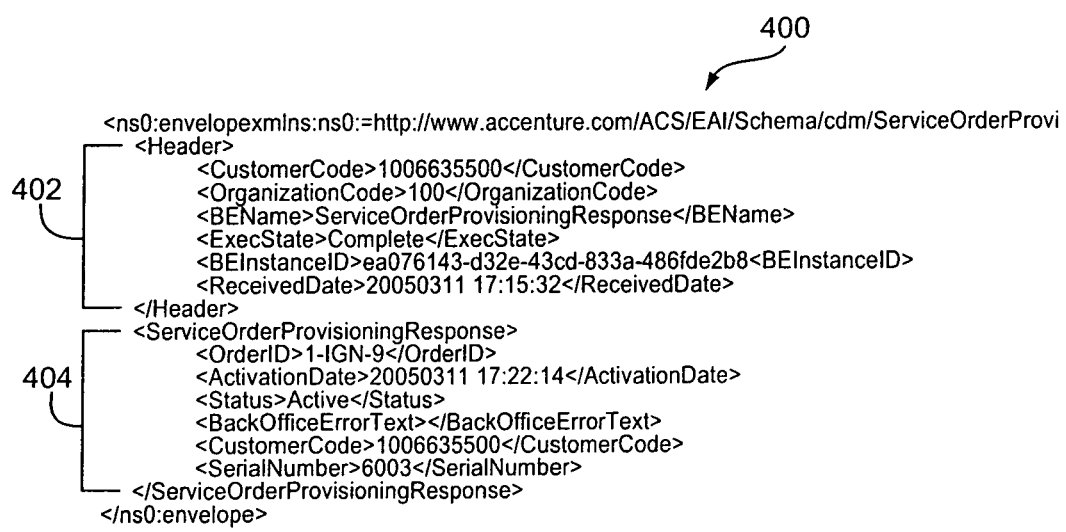
FIG. 21 is an example of an Internet Access Service Order For Provisioning Response message.

A Service Order For Provisioning business event is complete when the Service Order For Provisioning message is received by the provisioning system 20. However, the order provisioning process initiated by the Service Order For Provisioning business event continues. The tasks associated with provisioning the product or products identified in the Service Order For Provisioning message are carried out by the provisioning system 20 or other appropriate applications and their status is monitored by the IOM 22. The provisioning system 20 publishes a Service Order For Provisioning Response message each time it finishes provisioning a product. Thus, in the case of the Triple Play product, the provisioning system 20 publishes a service order for provisioning response for each of the Internet Access, the VoIP and IPTV Products and Triple-Play product itself. FIG. 21 shows a sample service order for provisioning response message published by the provisioning system 20. The service order for provisioning response message 400 includes two data objects, Header 402 and a Service Order Response 404. The header contains data fields for the CustomerCode, OrganizationCode, BusinessEventName, ExecutionState, BusinessEventInstanceID, and ReceivedDate similar to the Header data from the service order for provisioning message 300 of FIG. 20. The Service Order Response data object includes the data fields OrderID, ActivationDate, Status, BackOfficeErrorText, CustomerCode and SerialNumber. In the example shown, the OrderID field holds the value 1-IGN-9 which corresponds to the OrderID of the original Triple Play Product order created in the CRM 14. The Activation Data indicates the date on which the product was provisioned. The Status indicates that the product has been installed. The BackOfficeErrorText provides for custom messages to be sent to the CRM 14. (In this case the BackOfficeErrorText field is left open.) Finally, the SerialNumber contains the identifier of the provisioned item, in the example shown the SerialNumber field holds the value 6003 which corresponds to the VoIP product.

A Service Order For Provisioning Response business event is published by the provisioning system 20. By definition the CRM 14 is the only subscriber. The provisioning system 20 publishes a Service Order for Provisioning Response for each product it provisions. Returning to the sequence diagram of FIG. 18, the provisioning system 20 sends the Service Order For Provisioning Response message 212 to the EAI 12. The Service Order For Provisioning Response message is examined by the IOM 22. If the service order for provisioning response indicates that there has been a problem provisioning the product, the Service Order For Provisioning Response message is forwarded to the Exceptions database 202 at step 214, before being forwarded to the CRM 14 in step 216. If the Service Order For Provisioning response Message 212 received by the EAI indicates that the product was provisioned properly, the Service Order For Provisioning Response message is forwarded directly to the CRM 14 at step 216 without a message being sent to the Exceptions database 202.

Before the EAI 12 forwards the Service Order For Provisioning Response message to the CRM 14, the IOM 22 decomposes the message in order to update the provisioning task list that was created in response to the corresponding Service Order For Provisioning message published by the CRM 14 in response the original Triple Play order. For example, when the IOM receives the Service Order For Provisioning Response for the VoIP Product, the status of the "Provision VoIP" task may be updated from "Provisioning" to "Installed" or "Complete". After updating the task list the IOM 22 causes the EAI 12 to publish the Service Order For Provisioning Response message to the CRM 14 at step 216. The CRM echoes the received Service Order For Provisioning Response message back to the EAI at 218 to ensure that the message was accurately transmitted to and received by the CRM 14. Upon receiving the echoed response 218 from the CRM 14, the IOM 22 may consider the CRM Update task complete for the particular product for which the Service Order For Provisioning Response was published. Thus, in the context of the Triple Play product, the IOM 22 separately updates the CRMUpdate task for each of the composite products, namely Internet Access, VoIP and IPTV when the Service Order For Provisioning Response for each product is echoed back by the CRM 14.

At this point in the Triple Play provisioning process the only tasks that remain are the Internet Access activation, the VoIP activation, the IPTV activation, and the Triple Play CRM update. Activation of the various services may be accomplished in a number of different ways. For example, for internet protocol related services such as Internet Access, VoIP and IPTV, activation may be accomplished on-line via the Web portal 24. Alternatively activation may be initiated by a customer service representative via the CRM 14 or some other integrated application.

Figure 19:
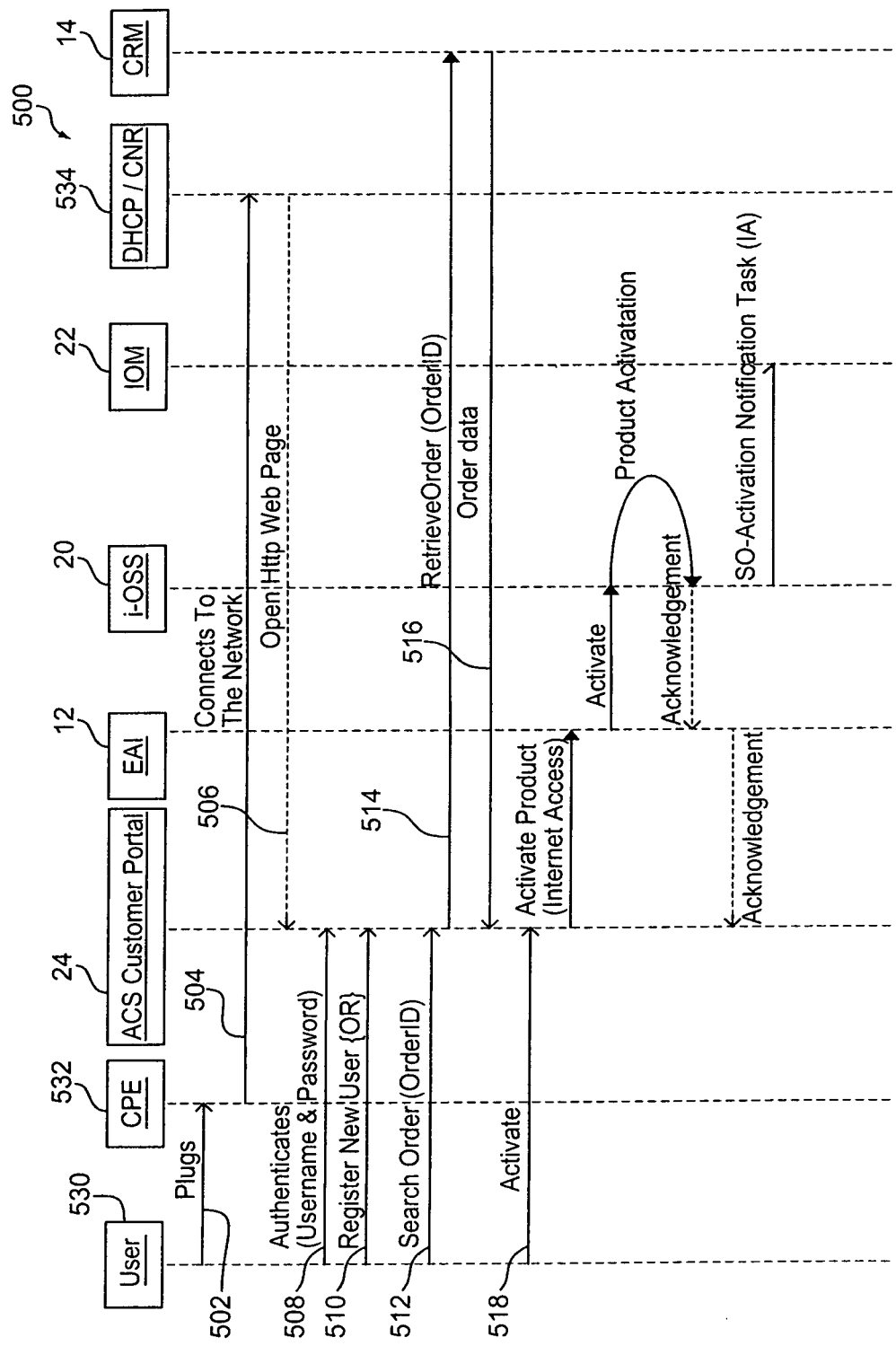
FIG. 19 is a sequence diagram illustrating the messages exchanged in in order to activate a provisioned product.
Figure 20A:
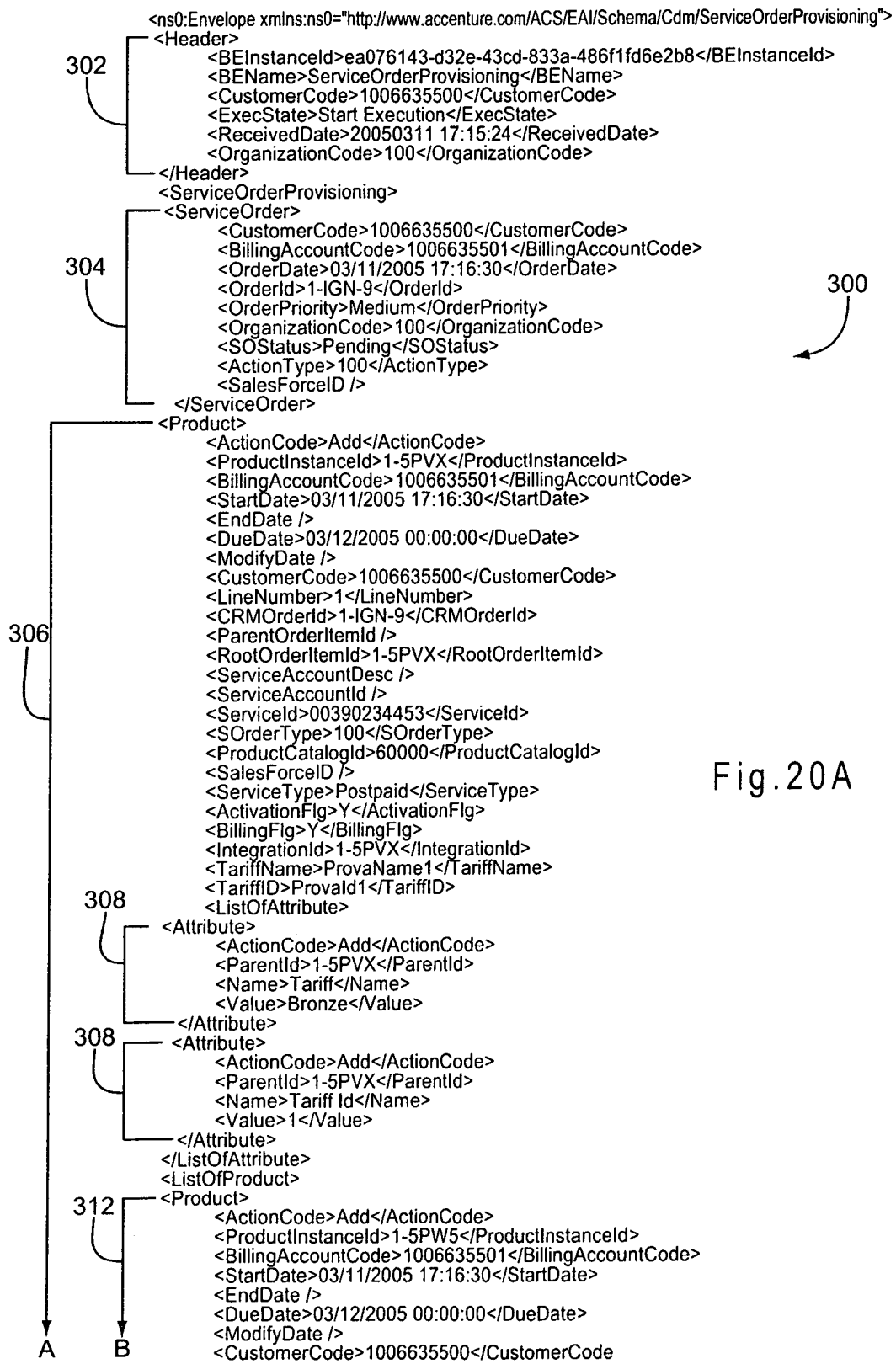
FIGS. 20A-20D are an example Triple Play Service Order For Provisioning message.
Figure 20B:
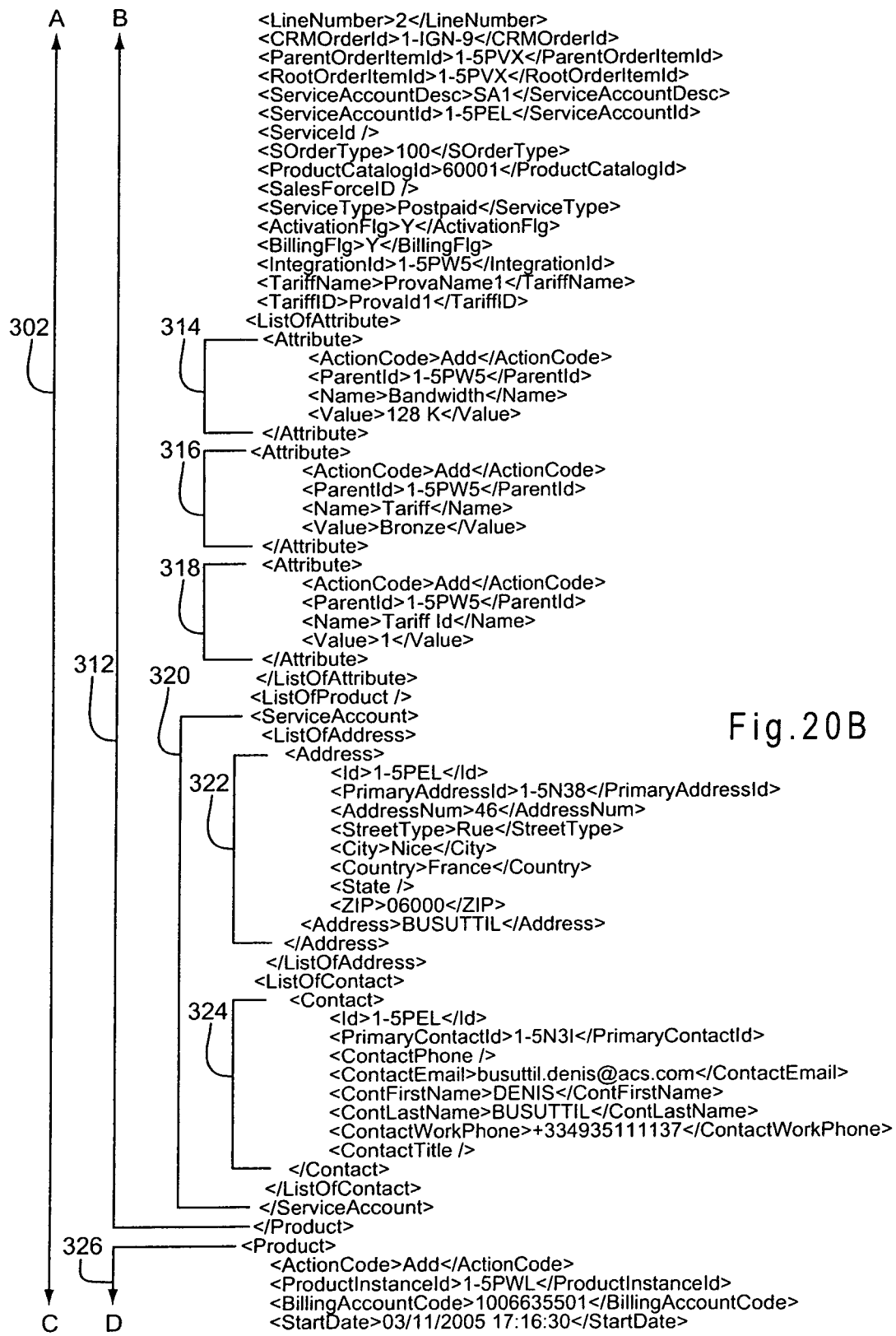
Figure 20C:
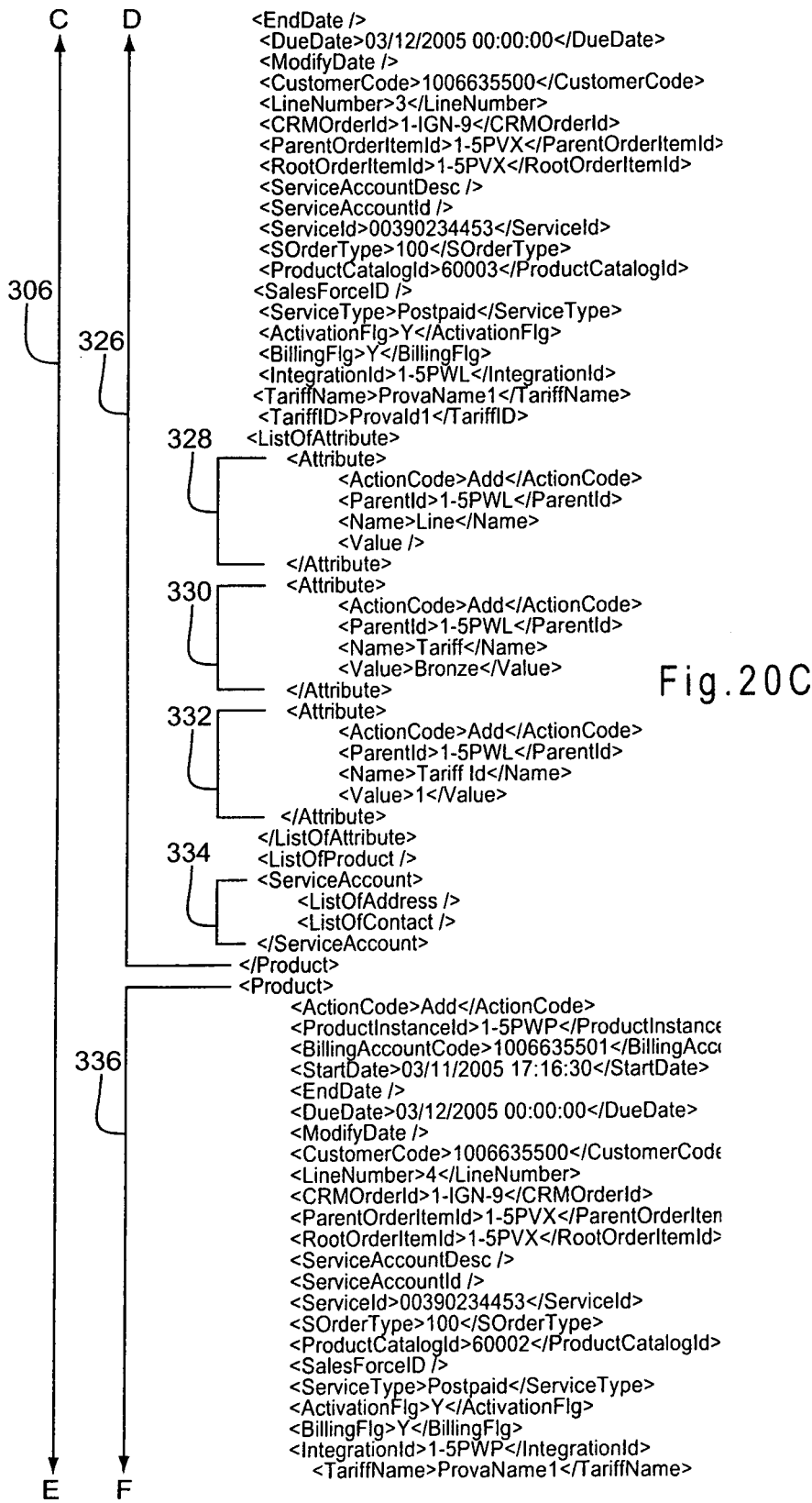
Figure 20D:
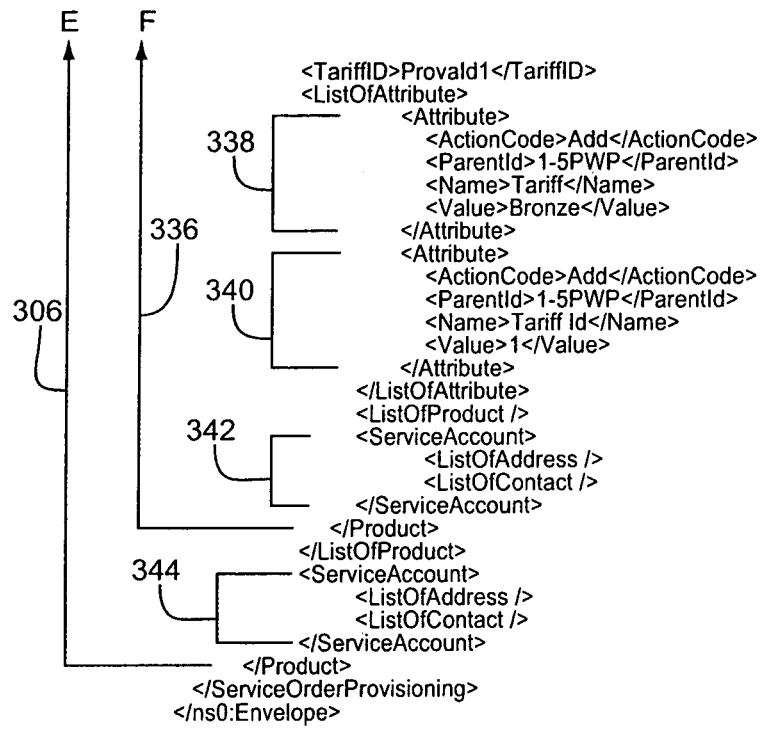

FIG. 19 shows a sequence diagram illustrating a customer self activation procedure for the Internet Access portion of the Triple Play product. The customer receives the customer premises equipment (CPE) necessary to for the customer to connect to the service provider's network at 502. Using the newly installed CPE equipment the customer connects to the service provider's network at 504. DHCP is a protocol to manage IP addresses for devices such as PCs, Modems, STBs, VoIP phones. CNR is a product that implements the protocol widely used by many telecommunications service providers. The customer's CPEs communicate to DHCP to obtain a proper IP address. The DHCP/CNR verifies that the MAC address received from the CPE 532 does not correspond to an existing previously activated MAC address and instructs the web portal 24 to open an HTTP web page for user self activation at 506. The user enters data in the various fields provided in the activation page, and the user's web browser transmits the user data to the web portal 24. The user entered data messages sent to the web portal 24 include Authentication Data (Username and Password) 508, RegisterNewUser 510, and SearchOrderID 512. Upon receiving the User Name and Password, the RegisterNewUser and SearchOrderId messages, 508, 510, 512, the web portal 24 sends a RetrieveOrder message 514 to the CRM 14. The CRM 14 responds by sending the customer order data to the web portal at 516. Once the web portal is armed with the customer's order data, the user may initiate the activation process from the customer's web browser. The user 530 sends the Activate command to the web portal 24 at 518. The web portal then publishes an Activation message to the provisioning system 20 via the EAI 12 at 520. The EAI forwards the Activation message to the provisioning system 20 at 522, and the provisioning system proceeds to activate the service. Upon completing the activation process the provisioning system 20 sends an Activation Acknowledgement message to the customer portal 24, again via the EAI 12 at 524 and 526. Finally, the provisioning system 20 sends a Service Order Activation notification to the IOM 22. The IOM 22, which is monitoring the status of the various provisioning tasks, is waiting for the Activation Acknowledgement for indication that the Internet Access activation task is complete. Upon receiving the activation acknowledgement the IOM may upgrade the status of the Internet Access Activation Task to "Complete".

In an alternative Activation sequence, a customer service representative (CSR) may manage the service activation through the CRM 14. Rather than the customer interacting with the web portal 24 and the web portal initiating the product activation process, the same or similar steps for activating the various products could be initiated by the CSR through the CRM 14.

As the IOM 22 task list indicates, all of the Triple Play products require separate activation. In addition to the Internet access product described above, the VoIP and IPTV products may be activated in a similar manner. Once all of the sub-products have been activated the IOM 22 may publish the Service Order For Provisioning Response message for the composite Triple Play product to the CRM 14 indicating that all of the provisioning tasks have been performed and that provisioning of the entire Triple Play product is complete. Thus, the Triple Play product, a composite product comprising a plurality of sub-products, (Internet Access, VoIP, IPTV) is successfully provisioned by the integration framework 10 in response to a single customer order.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

The invention claimed is:

1. A system for provisioning a composite telecommunications services product comprising a plurality of telecommunications services sub-products, the system comprising:

a computer and a non-transitory computer readable storage medium in communication with the computer that incudes instruction code that causes the computer to:

receive a customer order that specifies a composite product via a computer network interface of the computer;

implement an order entry module for generating an order for the composite product specified in the customer order;

implement an order management module configured to receive the order, identify one or more tasks for implementing the composite product, monitor task status, and report when the one or more tasks are complete;

implement a provisioning module configured to communicate, via the computer network interface, information that facilitates configuration of network equipment for delivering telecommunications services associated with each sub-product, wherein the provisioning module is configured to configure equipment over a network; and wherein the order management module is further configured to communicate one or more provisioning requests associated with the one or more tasks to the provisioning module, receive one or more responses associated with the one or more provisioning requests, and determine the task status associated with the one or more tasks, wherein the task status indicates whether provisioning of a task is complete or whether a provisioning error has occurred, wherein each of the one or more provisioning requests specifies a due date for completion of an associated task, wherein at least some of the due dates are different, wherein a provisioning error occurs when provisioning of a task of the one or more tasks is not completed by an associated due date specified in a provisioning requests associated with the task, wherein if a provisioning error has occurred, the order management module stores the provisioning request associated with the task to an exceptions database that resides on a storage device of a computer.

2. The system of claim 1 wherein the order management module comprises a product catalog database for defining products and identifying tasks associated with implementing the products.

3. The system of claim 2 wherein the product catalog database is organized in a hierarchical manner such that a composite product may be defined as a combination of sub-products, and the tasks associated with implementing the sub-products are associated with implementing the composite product.

4. The system of claim 1 wherein the composite telecommunications services product comprises internet access, voice over internet protocol, and internet protocol television sub-products.

5. The system of claim 4 wherein the tasks for implementing the composite telecommunications services product include updating the order entry module regarding a status of an identified task.

6. The system of claim 4 wherein the tasks for implementing the composite telecommunications services product include at least one of provisioning internet access, shipping customer premises equipment, activating the internet access service, or updating the order entry module when the tasks associated with implementing the internet access product are complete.

7. The system of claim 4 wherein the tasks for implementing the composite telecommunications services product include at least one of provisioning internet protocol television service; activating internet protocol television service, or updating the order entry module when the tasks associated with implementing the internet protocol television product are complete.

8. The system of claim 4 wherein the tasks for implementing the composite telecommunications services product include at least one of provisioning voice over internet protocol service, activating voice over internet protocol service, or updating the order entry module when the tasks associated with implementing the voice over internet protocol product are complete.

9. A system for provisioning orders for a composite telecommunications services product comprising a plurality of bundled services, the system comprising:
a computer and a non-transitory computer readable storage medium in communication with the computer that includes instruction code that causes the computer to:
receive a customer order that specifies a composite telecommunications services product via a computer network interface of the computer;
implement a Customer Relationship Management Module (CRM) for interacting with a customer, including generating an order for the composite telecommunications services product, the order identifying the composite telecommunications services product and each bundled service specified in the order;
implement an Integrated Order Management System (IOM) for receiving the order, decomposing the order, and identifying tasks for provisioning each of the bundled services;
implement a provisioning system configured to communicate, via the computer network interface, information that facilitates performance of provisioning tasks identified by the IOM and communicating a task status back to the IOM for each task, wherein the provisioning system is configured to configure equipment over a network; and
wherein the IOM is further configured to communicate one or more provisioning requests associated with the tasks to the provisioning system, receive one or more responses associated with the one or more provisioning requests, and determine the task status associated with the tasks, wherein the task status indicates whether provisioning of a task is complete or whether a provisioning error has occurred, wherein each of the one or more provisioning requests specifies a due date for completion of an associated task, wherein at least some of the due dates are different, wherein a provisioning error occurs when provisioning of a task of the one or more tasks is not completed by an associated due date specified in a provisioning requests associated with the task, wherein if a provisioning error has occurred, the order management module stores the provisioning request associated with the task to an exceptions database that resides on a storage device of a computer.

10. The system of claim 9 further comprising an enterprise application integration module adapted to facilitate data communication between the CRM the IOM, and the provisioning system.

11. The system of claim 10 wherein the enterprise application integration module employs a shared data model for exchanging data between the CRM, the IOM, and the provisioning system according to predefined structured messages.

12. The system of claim 11 wherein a predefined structured message comprises a provisioning request published by the CRM in response to the customer order generated by the CRM.

13. The system of claim 12 wherein the provisioning request includes a plurality of product data objects, a first product data object corresponding to the composite telecommunications services product, and additional product data objects corresponding to the bundled services comprising the composite telecommunications product, the product data objects including data fields defining the relationship between the bundled services and the telecommunications services product.

14. The system of claim 13 wherein the bundled services comprise Internet access, Voice Over Internet Protocol (VoIP) and Internet Protocol Television (IPTV).

15. The system of claim 11 wherein a predefined structured message comprises a provisioning response published by the provisioning system upon completion of a provisioning task.

16. The system of claim 15 wherein the provisioning response includes at least one product data object corresponding to a bundled service for which a provisioning task has been completed.

17. The system of claim 11 further comprising an internet portal, wherein a predefined structured message comprises an activation request published by the internet portal in response to customer input relating to a bundled service.

18. A system for provisioning a plurality of telecommunications services in a single customer order, the system comprising:
a computer and a non-transitory computer readable storage medium in communication with the computer that includes instruction code that causes the computer to:
receive a customer order that specifies a plurality of telecommunications services via a computer network interface of the computer;
implement a customer relationship management module for generating a customer order for a product comprising the plurality of telecommunications services specified in the customer order;
implement an operational support systems for provisioning the telecommunications services including identifying and configuring network elements necessary, via a network, to deliver the telecommunications services to a customer;
implement an enterprise application integration module facilitating data exchange between the customer relationship management module and the operational support systems; and
implement an integrated order management module associated with the enterprise application integration module, the integrated order management module adapted to receive and parse the customer order in order to determine which telecommunications services are to be delivered to the customer, and generate a list of tasks that must be performed to provision the services for delivery to the customer, wherein the integrated order management module is configured to communicate one or more provisioning requests associated with the tasks to the operational support systems, receive one or more responses associated with the one or more provisioning requests, and determine a task status associated with the tasks, wherein the task status indicates whether provisioning of a task is complete or whether a provisioning error has occurred, wherein each of the one or more provisioning requests specifies a due date for completion of an associated task, wherein at least some of the due dates are different, wherein a provisioning error occurs when provisioning of a task of the one or more tasks is not completed by an associated due date specified in a provisioning requests associated with the task, wherein if a provisioning error has occurred, the order management module stores the provisioning request associated with the task to an exceptions database that resides on a storage device of a computer.

19. The system of claim 18 wherein the plurality of telecommunication services comprise voice over internet protocol; internet access and internet protocol television.

20. The system of claim 18 further comprising interface adaptors for exchanging data between the customer relationship management module and the enterprise application integration module and between the operational support systems and the enterprise application integration module.

21. The system of claim 20 wherein the enterprise application integration module employs a shared data model for communicating data between applications, and data are exchanged between applications according to pre-defined messages comprised of one or more data objects.

22. The system of claim 21 wherein the customer relationship management module is adapted to publish a service order for provisioning message in response to the customer order.

23. The system of claim 22 wherein the operational support systems are adapted to publish a service order for provisioning response message to the customer relationship management module when the provisioning tasks have been completed.

24. A method of provisioning a communications product comprising a plurality of communications services, the method comprising:
providing an enterprise application integration module for facilitating data communication between a plurality of systems applications according to a shared object model;
generating a customer order for the product in a computer-implemented customer relationship management application;
communicating, by a computer, a service order for provisioning request for the product to an order management application associated with the enterprise application module;
parsing, by the computer, the service order for provisioning request in the order management application and generating a list of tasks for provisioning the product, wherein the provisioning request specifies a plurality of due dates for completion of the tasks, wherein at least some of the due dates are different;
communicating the provisioning tasks to a provisioning application, and monitoring the status of the tasks, wherein the provisioning application executes on equipment configured to configure equipment over a network;
performing the provisioning tasks in the provisioning application;
alerting the customer relationship management application when the provisioning tasks are complete;
determining by the computer whether provisioning tasks are completed by a due date associated with the provisioning task;
if the provisioning tasks is not completed by the due date, further alerting the customer relationship management application that the provisioning tasks has not been completed by the due date associated with the provisioning task; and
storing, by the computer, the service order for provisioning request to an exceptions database that resides on a storage device of the computer.

25. The method of claim 24 wherein the plurality of communications services includes internet access, voice over internet protocol; and internet protocol television.

26. The method of claim 24 wherein a first task comprises sending customer premises equipment to a customer, and a second task comprises activating a service when the customer premises equipment is installed at the customer premises.

27. The method of claim 24 wherein activating a service comprises contacting a web portal via the customer premises equipment;
the web portal communicating an activation request to the provisioning application via the enterprise application integration module.

28. The method of claim 24 wherein the service order for provisioning request comprises a structured message including a plurality of pre-defined data objects.

29. The method of claim 28 wherein the plurality of pre-defined data objects includes at least one data object relating to the communications product and at least one data object relating to each communications service comprising the product.

30. The method of claim 29 wherein the list of tasks comprises provisioning each service comprising the product.

31. The method of claim 30 further comprising sending a service order for provisioning request from the order management application to the provisioning application for each service comprising the product.

32. The method of claim 31 further comprising sending a provisioning response from the provisioning application to the order management application for each service comprising the product when each service has been successfully provisioned.

33. The method of claim 30 further comprising sending a single service order for provisioning request from the order management application to the provisioning application for provisioning each of the services comprising the product.

34. The method of claim 33 further comprising sending a single provisioning response from the provisioning application.

35. A method of provisioning a composite communications product comprising a plurality of sub-products, the method comprising:

defining, by a computer, a plurality of shared data objects;

defining, by the computer, a plurality of structured messages incorporating the data objects for transferring data between integrated applications;

creating, by the computer, a service order provisioning message according to one of the plurality of defined structured messages, the service order provisioning message comprising data objects corresponding to the composite product and each of the sub-products, wherein for each sub-product, the service order provisioning message specifies a due date for completion of provisioning of the sub-product, wherein at least some of the due dates are different;

publishing the service order provisioning message from a first application;

receiving the service order provisioning message at a second application;

communicating to the first application a task status associated with the service order provisioning message, wherein the task status indicates a provisioning error when a task associated with the service order provision message is not provisioned within by a due date specified in the service order provisioning message; and if a provisioning error has occurred, storing the service order provisioning message to an exceptions database that resides on a storage device of the computer.

36. The method of claim 35 wherein the second application comprises an application adapted to provision at least one of the sub-products.

37. The method of claim 35 wherein the second application comprises an order management module adapted to parse the service order provisioning message and generate a list of tasks for provisioning each of the subproducts.

38. The method of claim 37 further comprising publishing a service order provisioning message from the order management module to a provisioning application for provisioning at least one of the sub-products.

39. The method of claim 38 wherein the sub-products comprise internet access, internet protocol television, and voice over internet protocol.

40. The method of claim 35 wherein the sub-products comprise internet access, internet protocol television and voice over internet protocol.

41. The method of claim 40 wherein the first application comprises an order entry system and the second application comprises an integrated order management module, the integrated order management module adapted to compile and monitor a list of tasks for provisioning internet access, internet protocol television, and voice over internet protocol.

42. The method of claim 41 further comprising providing a network provisioning application, and wherein the list of provisioning tasks comprises:

publishing a service order provisioning message to the network provisioning application for provisioning internet access;

shipping customer premises equipment to a customer;

publishing an activation message to the network provisioning application for activating the internet access sub-product;

publishing a service order provisioning message to the network provisioning application for provisioning internet protocol television;

publishing an activation message to the network provisioning application for activating the internet protocol television sub-product;

publishing a service order provisioning message to the network provisioning application for provisioning the voice over internet protocol sub-product; and publishing an activation message to the network provisioning application for provisioning the voice over internet protocol sub-product.

* * * * *